United States Patent
Otto

(10) Patent No.: US 11,753,854 B2
(45) Date of Patent: Sep. 12, 2023

(54) ACTIVATION INSTALLATION

(71) Applicant: Brose Schliesssysteme GmbH & Co. Kommanditgesellschaft, Wuppertal (DE)

(72) Inventor: Andreas Otto, Siegen (DE)

(73) Assignee: Brose Schliesssysteme GmbH & Co. Kommanditgesellschaft, Wuppertal (DE)

( * ) Notice: Subject to any disclaimer, the term of this patent is extended or adjusted under 35 U.S.C. 154(b) by 482 days.

(21) Appl. No.: 15/786,012

(22) Filed: Oct. 17, 2017

(65) Prior Publication Data
US 2018/0106080 A1 Apr. 19, 2018

(30) Foreign Application Priority Data

Oct. 17, 2016 (DE) ...................... 10 2016 119 721.1

(51) Int. Cl.
*E05B 79/20* (2014.01)
*B60J 5/06* (2006.01)
(Continued)

(52) U.S. Cl.
CPC .................. *E05B 79/20* (2013.01); *B60J 5/06* (2013.01); *E05B 79/22* (2013.01); *E05B 83/40* (2013.01)

(58) Field of Classification Search
CPC .......... E05B 79/20; E05B 79/22; E05B 83/40; E05B 79/10; E05B 79/12; E05B 79/14;
(Continued)

(56) References Cited

U.S. PATENT DOCUMENTS 2,039,319 A 5/1936 Knowlton
3,355,960 A * 12/1967 Bureck .................... G05G 9/02
74/471 R
(Continued)

FOREIGN PATENT DOCUMENTS

DE 202011002760 6/2012
DE 202011002760 U1 * 6/2012 ................ F16C 1/12
(Continued)

OTHER PUBLICATIONS

Machine Translation of FR 2971536 A1,2020, pp. 1-11 (Year: 2020).*
(Continued)

*Primary Examiner* — Christine M Mills
*Assistant Examiner* — Yahya Sidky
(74) *Attorney, Agent, or Firm* — Pauly, DeVries Smith & Deffner LLC

(57) ABSTRACT

An activation installation for a motor vehicle door having a distribution installation and a flexible transmission means. The distribution installation has a first input and first and second outputs, and is configured for distributing an activation movement to two functional units. The flexible transmission means is configured for transmitting the activation movement at least in portions from the distribution installation to the first or second functional unit. In the assembled state, on a first portion of an activation movement that acts on the first input of the distribution installation, the first input for transmitting the activation movement in portions to the second functional unit is coupled or is to be coupled to the second output. At the commencement of a second portion of the activation movement, the first input and the second output for interrupting the transmission of the activation movement to the second functional unit are decoupled.

19 Claims, 4 Drawing Sheets

(51) Int. Cl.
  *E05B 79/22* (2014.01)
  *E05B 83/40* (2014.01)
(58) Field of Classification Search
  CPC ........ E05B 63/143; E05B 79/16; E05B 79/18;
       B60J 5/06; Y10T 292/57; Y10S 292/03;
       Y10S 292/23; Y10S 292/62; G05G 9/08;
       F16C 1/101; F16C 1/10; F16C 1/106;
       F16C 2350/52
  USPC ........... 292/336.3, DIG. 3, DIG. 23, DIG. 62
  See application file for complete search history.

(56) References Cited

U.S. PATENT DOCUMENTS

| | | | | |
|---|---|---|---|---|
| 4,374,597 A | * | 2/1983 | Mochida | F16C 1/10 |
| | | | | 292/336.3 |
| RE31,899 E | * | 5/1985 | Mochida | F16C 1/10 |
| | | | | 292/336.3 |
| 4,526,057 A | * | 7/1985 | Mochida | E05B 53/005 |
| | | | | 292/336.3 |
| 4,633,724 A | * | 1/1987 | Mochida | E05B 53/005 |
| | | | | 296/76 |
| 5,660,081 A | | 8/1997 | Sato et al. | |
| 5,829,314 A | * | 11/1998 | Scura | B60T 11/06 |
| | | | | 74/502.4 |
| 6,027,070 A | * | 2/2000 | Zambelli | B64C 25/30 |
| | | | | 244/102 R |
| 6,634,467 B2 | * | 10/2003 | Liu | B60T 11/046 |
| | | | | 188/24.16 |
| 2013/0140831 A1 | | 6/2013 | Kempel et al. | |

FOREIGN PATENT DOCUMENTS

| | | | | |
|---|---|---|---|---|
| EP | 0950939 | | 10/1999 | |
| FR | 2971536 | | 8/2012 | |
| FR | 2971536 A1 | * | 8/2012 | ............. E05B 85/12 |
| GB | 616900 A | * | 1/1949 | ............... G05G 9/08 |

OTHER PUBLICATIONS

Machine Translation of DE 202011002760 U1, 2020, pp. 1-10 (Year: 2020).*
Chinese Search Report for Chinese Patent Application No. 201710966658.1 dated Mar. 24, 2019 (2 pages).
"German Search Report," for German Patent Application No. DE102016119721.1 (priority application for U.S. Appl. No. 15/786,012) dated Aug. 28, 2017 (9 pages).
European Search Report for European Patent Application No. 17196753.2 dated Mar. 15, 2018 (8 pages).

* cited by examiner a)

b)

ACTIVATION INSTALLATION

CLAIM OF PRIORITY

This application claims the benefit of German Patent application No. DE 10 2016 119 721.1 filed on Oct. 17, 2016, the disclosure of which is incorporated herein by reference.

FIELD OF THE TECHNOLOGY

The disclosure relates to an activation installation for a motor vehicle door, to a motor vehicle door, and to a method for activating an activation installation.

BACKGROUND

Activation installations of the type presently discussed can be used in many regions of a motor vehicle. The present use is primarily in the region of a motor vehicle door. Such motor vehicle doors can be, for example, pivoting doors, sliding doors, gullwing doors, lids, in particular hatchback lids, boot lids, engine bonnets, cargo-space floors or the like of a motor vehicle.

An activation installation in the context of a sliding-door assembly of a motor vehicle is described in particular in DE 20 2011 002 760 U1. The sliding door has an activation installation having a motor vehicle lock, a door handle, and a distribution installation. In the latter, activation movements of the door handle are distributed by the distribution installation to the motor vehicle lock and to a motor vehicle secondary lock such that both the motor vehicle lock as well as the secondary lock can be opened by way of an activation movement of the door handle.

It is disadvantageous in this construction that the operator has to overcome the restoring forces of the motor vehicle lock as well as of the secondary lock across the entire movement path in order for the motor vehicle door to be opened. This leads to relatively high activation forces that have to be applied to the door handle, or to comparatively long adjustment paths in the case of comparatively high chosen gearing. Moreover, the construction is comparatively complex and thus also expensive in terms of production.

SUMMARY

The disclosure is thus based on the object of designing and refining the known activation installation in such a manner that the operating comfort of the activation installation for the user is enhanced in a simple and cost-effective manner.

On account of the fact that in the assembled state of the activation installation, on a first portion of an activation movement that acts on the first input of the distribution installation, the first input for transmitting the activation movement in portions to the second functional unit is coupled or is to be coupled to the second output, and that at the commencement of a second portion of the activation movement, the first input and the second output for interrupting the transmission of the activation movement to the second functional unit are decoupled, a restoring force of the second functional unit no longer has to be overcome on the second portion of the activation movement, such that the force that has to be applied in the second portion of the activation movement can be reduced. The operating comfort for the user is enhanced on account thereof.

According to an embodiment, in the assembled state of the activation installation, on a second portion of an activation movement that acts on the first input of the distribution installation, the first input for transmitting the activation movement in portions to the first functional unit is coupled or is to be coupled to the first output. Additionally or alternatively, in the assembled state of the activation installation, on a first portion of an activation movement that acts on the first input of the distribution installation, the first input for transmitting the activation movement in portions to the first functional unit is coupled or is to be coupled to the first output. The first input and the first output can be fixedly coupled. The tuning of the distribution installation, of the first functional unit, and of the second functional unit herein can be chosen such that the second functional unit is activated on the first portion, a freewheel feature or a clearance, respectively, being travelled through in the first functional unit, or in a transmission means from the distribution installation to the first functional unit, respectively, and the second functional unit is then decoupled and the first functional unit activated on the second portion. A splitting of the activation path, or of the activation forces, respectively, of the two functional elements results in this instance in particular.

According to an embodiment, the activation installation can have the first functional element, wherein the first functional unit can be a motor vehicle lock, in particular a primary lock. The activation installation in this instance forms a motor vehicle lock arrangement. According an embodiment, the activation installation can have the second functional unit, wherein the second functional unit can be a secondary lock and/or a door arrester. In this instance, the second output, in particular by way of the flexible transmission means, can be coupled to a release lever of the secondary lock and/or to a release lever of the door arrester. Such a design embodiment of the activation installation is particularly advantageous since for security reasons a clearance is typically provided in the activation chain between the motor vehicle lock and the door handle; however, such a clearance is not required for a door arrester and/or a secondary lock. Moreover, the force that is required by a user for activating the functional elements can thus be distributed across the activation movement in a manner that is comfortable for said user.

According to an embodiment, the activation installation can have a further flexible transmission means for transmitting the activation movement at least in portions from the first output to the first functional unit. The further flexible transmission means herein can couple the first output to the external activation lever and/or to the internal activation lever of the motor vehicle lock. A particularly flexible arrangement of the distribution installation on the motor vehicle door is moreover enabled on account thereof. According to an embodiment, the activation installation can furthermore have a door handle, in particular an internal door handle and/or an external door handle, which acts on the first input of the distribution installation. The door handle herein can act on the first input by way of a flexible transmission means. Moreover, this design embodiment and the linkage in each case by way of flexible transmission means also permit a very liberal arrangement of the distribution installation on the motor vehicle door.

A second input and/or a third output can be provided in various embodiments. According to an embodiment, the transmission of the activation movement at least in portions is performed from the third output to the first functional unit or to a third functional unit. A further door handle, in particular an internal door handle and/or an external door handle, which acts on the second input of the distribution installation can furthermore be provided. Such a design embodiment enables a compact distribution installation to be achieved for both the internal door handle as well as for the external door handle.

The first input and/or the first output herein can be formed by a first coupling element. The second output can be formed by a second coupling element. According to an embodiment, the second input and/or the third output are formed by a third coupling element. This enables a particularly simple and cost-effective implementation of the distribution installation.

In an embodiment, the second coupling element for decoupling from the first and/or the third coupling element is moved out of the movement path of the first coupling element and/or of the third coupling element. The second coupling element herein can be configured so as to be displaceable or configured as a lever. In order for the functional reliability of the activation installation to be enhanced, the distribution installation can have a guide for guiding movements of the first coupling element, and/or the distribution installation can have guide for guiding movements of the second coupling element, and/or the distribution installation can have a guide for guiding movements of the third coupling element. In particular the second coupling element can also be guided by a guide and by the first or third coupling element, respectively.

For protection against environmental influences, the distribution installation and/or the first functional unit and/or the second functional unit can have a housing. In order for a particularly compact construction to be achieved, the housing can provide the guide or the guides, respectively, for the first and/or the second and/or the third coupling element.

In the case of a motor vehicle door, the object mentioned at the outset is achieved by the features described herein. The same advantages as have been described above in the context of the activation installation are derived.

Finally, the object described at the outset in terms of a method is achieved by a method described herein. The activation installation herein is advantageously configured in the manner described, or the method steps that are described in the context of the activation installation can be carried out, respectively. The same advantages as have been described in the context of the activation installation are derived.

Some embodiments provide an activation installation for a motor vehicle door, having a distribution installation and a flexible transmission means, wherein the distribution installation has a first input and a first output as well as a second output, and is configured for distributing an activation movement to two functional units, and wherein the flexible transmission means is configured for transmitting the activation movement at least in portions from the distribution installation to the first functional unit, or for transmitting the activation movement at least in portions from the distribution installation to the second functional unit, wherein in the assembled state of the activation installation, on a first portion of an activation movement that acts on the first input of the distribution installation, the first input for transmitting the activation movement in portions to the second functional unit is coupled or is to be coupled to the second output, and in that at the commencement of a second portion of the activation movement, the first input and the second output for interrupting the transmission of the activation movement to the second functional unit are decoupled.

In some embodiments, in the assembled state of the activation installation, on a second portion of an activation movement that acts on the first input of the distribution installation, the first input for transmitting the activation movement in portions to the first functional unit is coupled or is to be coupled to the first output, and/or in that in the assembled state of the activation installation, on a first portion of an activation movement that acts on the first input of the distribution installation, the first input for transmitting the activation movement in portions to the first functional unit is coupled or is to be coupled to the first output.

In some embodiments, the activation installation has the first functional unit, such that the first functional unit is a motor vehicle lock, in particular a primary lock, such that the first output is coupled to an external activation lever and/or an internal activation lever of the motor vehicle lock.

In some embodiments, the activation installation has the second functional unit, such that the second functional unit is a secondary lock and/or a door arrester, such that the second output, in particular by way of the flexible transmission means, is coupled to a release lever of the secondary lock and/or to a release lever of the door arrester.

In some embodiments, the activation installation has a further flexible transmission means for transmitting the activation movement at least in portions from the first output to the first functional unit, such that the further flexible transmission means couples the first output to the external activation lever or to the internal activation lever of the motor vehicle lock.

In some embodiments, the activation installation has a door handle, in particular an internal door handle and/or an external door handle, which acts on the first input of the distribution installation, such that the door handle acts on the first input by way of a flexible transmission means.

In some embodiments, the distribution installation has a second input, and in that in the assembled state of the activation installation, on a first portion of an activation movement that acts on the second input of the distribution installation, the second input for transmitting the activation movement in portions to the second functional unit is coupled or is to be coupled to the second output, such that at the commencement of a second portion of the activation movement, the first input and the second output for interrupting the transmission of the activation movement to the second functional unit are decoupled.

In some embodiments, the distribution installation has a third output, and in that in the assembled state of the activation installation, on a first portion of an activation movement that acts on the second input of the distribution installation, the second input for transmitting the activation movement in portions to the first functional unit and/or to a third functional unit is coupled or is to be coupled to the third output, and/or in that in the assembled state of the activation installation, on a second portion of an activation movement that acts on the second input of the distribution installation, the second input for transmitting the activation movement in portions to the first functional unit and/or to a third functional unit is coupled or is to be coupled to the third output.

In some embodiments, the activation installation has a flexible transmission means for transmitting the activation movement at least in portions from the third output to the first functional unit or to the third functional unit, such that the further flexible transmission means couples the third output to the internal activation lever or to the external activation lever of the motor vehicle lock.

In some embodiments, the activation installation has a further door handle, in particular an internal door handle and/or an external door handle, which acts on the second input of the distribution installation, such that the further door handle acts on the second input by way of a flexible transmission means.

In some embodiments, the first input and/or the first output are/is formed by a first coupling element, such that the first coupling element is configured so as to be integral, furthermore such that the transmission means at the first input and the first coupling element are configured so as to be integral, and/or in that the transmission means at the first output and the first coupling element are configured so as to be integral.

In some embodiments, the second output is formed by a second coupling element, such that the second coupling element is configured so as to be integral, furthermore such that the transmission means at the second output and the second coupling element are configured so as to be integral.

In some embodiments, the second input and/or the third output are/is formed by a third coupling element, such that the third coupling element is configured so as to be integral, furthermore such that the transmission means at the second input and the third coupling element are configured so as to be integral, and/or in that the transmission means at the third output and the third coupling element are configured so as to be integral.

In some embodiments, the second coupling element for decoupling from the first and/or the third coupling element is moved out of the movement path of the first coupling element and/or of the third coupling element, such that the second coupling element is configured so as to be displaceable or configured in the manner of a lever.

In some embodiments, the distribution installation has a guide for guiding movements of the first coupling element, and/or in that the distribution installation has a guide for guiding movements of the second coupling element, and/or in that the distribution installation has a guide for guiding movements of the third coupling element.

In some embodiments, the distribution installation and/or the first functional unit and/or the second functional unit have/has a housing, such that the housing provides the guide or the guides, respectively, for the first and/or the second and/or the third coupling element.

Various embodiments provide a motor vehicle door having an activation installation as described herein.

Some embodiments, provide a method for activating an activation installation having a distribution unit having a first input and a first output as well as a second output, in which method an activation movement acts on the first input of the distribution installation, and on a first portion of the activation movement the first input is coupled or is to be coupled to a second output, and at the commencement of a second portion of the activation movement the first input and the second output for interrupting the transmission of the activation movement to the second functional unit are decoupled.

In some embodiments of the method, the activation installation is configured according to the disclosure.

BRIEF DESCRIPTION OF THE DRAWINGS

Various aspects will be explained in more detail hereunder by means of a drawing which merely illustrates exemplary embodiments and in which.

DETAILED DESCRIPTION

Figure 1:
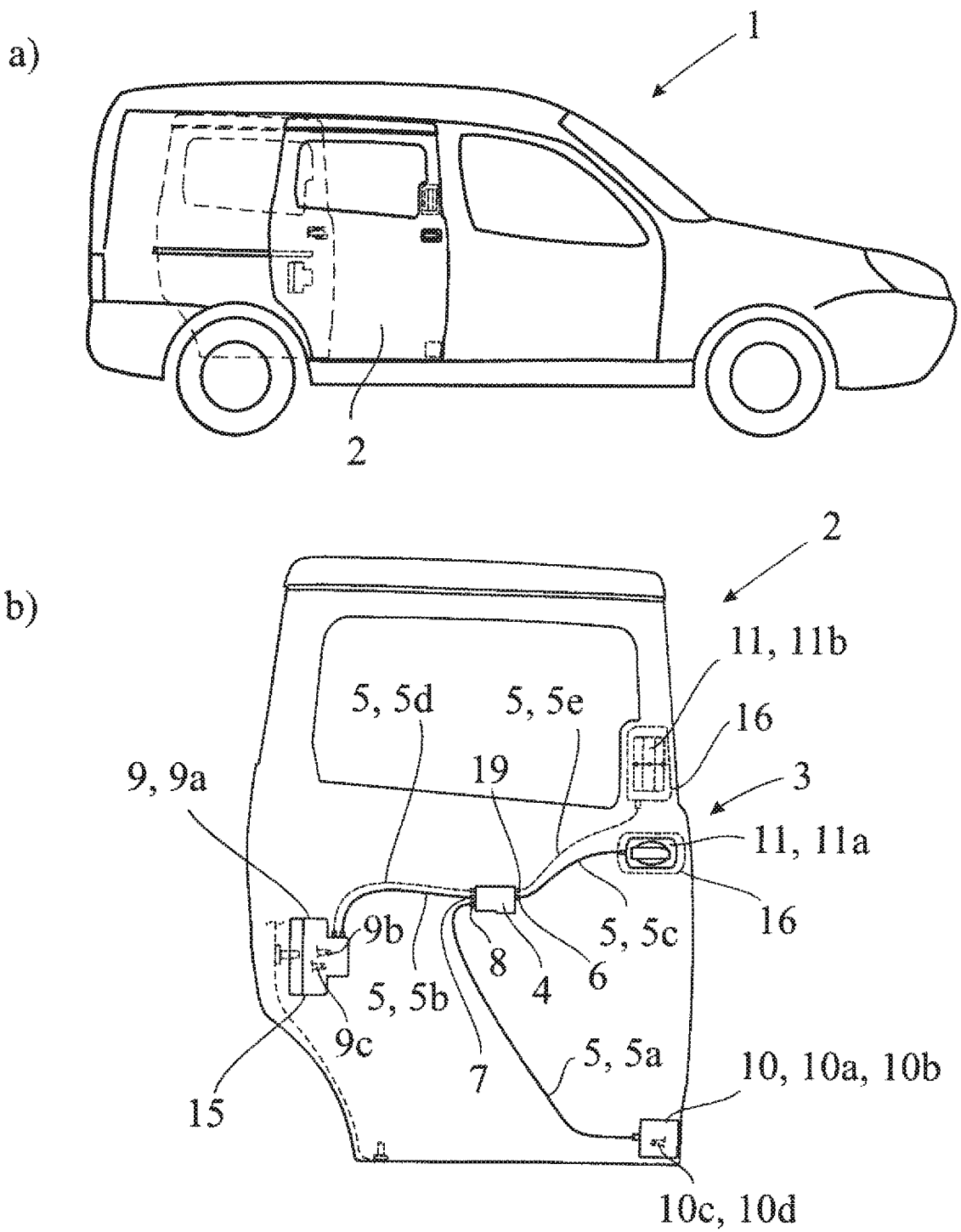
FIG. 1 in a) shows a motor vehicle having a motor vehicle door according to the proposal, and in b) shows the motor vehicle door having an activation installation according to the proposal.

A motor vehicle 1 having a motor vehicle door 2 according to the proposal is illustrated in FIG. 1a. As for the meaning of the term "motor vehicle door", reference may be made to the introductory part of the description. In particular, the motor vehicle door 2 can be any type of the motor vehicle doors 2 mentioned at the outset.

The motor vehicle door 2 from FIG. 1a is illustrated in FIG. 1b. Said motor vehicle door 2 has an activation installation 3 according to the proposal. The activation installation 3 has a distribution installation 4 and a flexible transmission means 5.

The distribution installation 4 has a first input 6 and a first output 7 as well as a second output 8. Said distribution installation 4 is furthermore configured for distributing an activation movement to two functional units 9, 10. The first functional unit 9 and/or the second functional unit 10 herein can be assigned to the activation installation 3. The first functional unit 9 herein can be a motor vehicle lock 9a, and the second functional unit 10 herein can be a secondary lock 10a and/or a door arrester 10b.

According to the proposal, the flexible transmission means 5 can be configured for transmitting the activation movement at least in portions from the distribution installation 4 to the first functional unit 9, or for transmitting the activation movement at least in portions from the distribution installation 4 to the second functional unit 10. A transmission means 5a for transmitting the activation movement at least in portions from the distribution installation to the second functional unit 10 can be provided in the exemplary embodiment, and a further transmission means 5b for transmitting the activation movement at least in portions from the distribution installation 4 to the first functional unit 9 can be provided in the exemplary embodiment.

The concept that underlies various embodiments is now that in the assembled state of the activation installation 3, on a first portion of an activation movement that acts on the first input 6 of the distribution installation 4, the first input 6 for transmitting the activation movement in portions to the second functional unit 10 is coupled or is to be coupled to the second output 8, and that at the commencement of a second portion of the activation movement, the first input 6 and the second output 8 for interrupting the transmission of the activation movement to the second functional unit 10 are decoupled.

On account thereof it is possible for an activation movement to be distributed to the two functional units 9, 10 in a particularly advantageous manner. If the first functional unit 9 is a motor vehicle lock 9*a*, in particular a primary lock, and if the second functional unit 10 is a door arrester 10*b* and/or a secondary lock 10*a*, by way of an activation movement on a first portion a clearance that is provided in the transmission means 5 and/or in the primary lock can first be travelled through, while the door arrester 10*b* and/or the secondary lock 10*a* is already being opened or released, respectively, such that on the second portion of the activation movement, following decoupling of the second functional element 10, thus in particular of the door arrester 10*b* and/or of the secondary lock 10*a*, force no longer has to be applied for the further adjustment of the second functional unit 10, and the force can be used for adjusting the first functional unit 9, thus the motor vehicle lock 9*a* herein. On account thereof, the effort in terms of force required, or the activation path required, respectively, is reduced by virtue of a gearing that is to be chosen so as to be higher. This leads to an increase in comfort for the user.

In a corresponding manner it is possible that in the assembled state of the activation installation 3, on a second portion of an activation movement that acts on the first input 6 of the distribution installation 4, the first input 6 for transmitting the activation movement in portions to the first functional unit 9 is coupled or is to be coupled to the first output 7, and/or that in the assembled state of the activation installation 3, on a first portion of an activation movement that acts on the first input 6 of the distribution installation 4, the first input 6 for transmitting the activation movement in portions to the first functional unit 9 is coupled or is to be coupled to the first output 7.

As has already been described above, the activation installation 3 can have the first functional unit 9. The latter can be a motor vehicle lock 9*a*, in particular a primary lock. Said motor vehicle lock 9*a* can be capable of being moved to different locking states. The latter can in particular be at least two or three of the locking states "unlocked", "locked", "anti-theft locked" and/or "child locked". The first output 7 in the exemplary embodiments is coupled to an external activation lever 9*b* of the motor vehicle lock 9*a*.

The actuation installation 3 can furthermore have the second functional unit 10. The latter herein can be a secondary lock 10*a* and/or a door arrester 10*b*. A secondary lock 10*a* in the closed state of the motor vehicle door 2 additionally locks the latter to the vehicle body. A door arrester 10*b* serves for holding the motor vehicle door 2 at least in an opened, in particular a fully opened, position. The second output 8 in the exemplary embodiment is coupled to a release lever 10*c* of the secondary lock 10*a* and/or to a release lever 10*d* of the door arrester 10*b*, in particular by way of the flexible transmission means 5, 5*a*.

In order for the activation movement to be transmitted at least in portions from the first output 6 to the first functional unit 9, the activation installation 3 has a further transmission means 5*b*. The further flexible transmission means 5*b* herein can couple to the first output 7 to the external activation lever 9*b*, or according to an alternative design embodiment to the internal activation lever 9*c* of the motor vehicle lock 9*a*.

In order for the activation movement to be generated, the activation installation 3 herein can have a door handle 11, in particular an internal door handle 11*b* and/or an external door handle 11*a*, which acts on the first input 6 of the distribution installation 4. The door handle 11 can act on the first input 6 by way of a flexible transmission means 5, 5*c*.

The first input 6 and the first output 7 in the exemplary embodiments can be formed by a first coupling element 12. As is shown in the exemplary embodiment, the first coupling element 12 can be configured so as to be integral. Particularly, the transmission means 5*c* at the first input 6, and the first coupling element 12 and/or the transmission means 5*b* at the first output 7, and the first coupling element 12 are configured so as to be integral, as is the case in all exemplary embodiments. However, in an alternative design embodiment, the coupling element 12 for example can also be configured so as to be integral, and the transmission means 5*b* at the first output 7 and/or the transmission means 5*c* at the first input 6 can be releasably connected to the coupling element 12. The connection between the first coupling element 12 and the transmission means 5, or the plurality of transmission means 5, respectively, can in this instance be designed as a snap-fit connection, for example.

The first coupling element 12 herein can have a substantially cuboid shape. Alternatively, the first coupling element 12 can however also have a cylindrical shape, for example. The distribution installation 4 has a guide 13 for guiding the movement of the first coupling element 12. The guide 13 herein can be provided by a housing 14. The housing in the exemplary embodiment is the housing 14 of the distribution installation 4. The distribution installation 4 herein can be disposed separately from the first functional element 9, separately from the second functional element 10, and separately from the door handle 11.

However, in an alternative design embodiment (not shown), it can also be provided that the distribution installation 4 is assigned to a motor vehicle lock 9*a*. In this case it can be that the distribution installation 4 is disposed in a housing 15 of the motor vehicle lock 9*a*. The housing 15 of the motor vehicle lock 9*a* can provide the guide in this instance.

Alternatively, the distribution installation 4 can also be disposed in a housing of the secondary lock 10*a* and/or of the door arrester 10*b*.

Alternatively, it can furthermore be provided that the distribution installation 4 is assigned to the door handle 11. In this case, the guide can be provided by a support structure 16 of the door handle 11, for example.

The second output 8 is formed by a second coupling element 17. The latter can be also configured so as to be integral. In particular, said second coupling element 17 can also be configured so as to be integral to the transmission means 5*a* at the second output 8, as is the case at least in the exemplary embodiments of FIGS. 2 and 4*a*. However, for example, the second coupling element 17 can also be releasably connected to the transmission means 5*a*, for example by means of a snap-fit connection.

Various design embodiments of the coupling element 17 are moreover possible. The second coupling element 17 herein can be configured so as to be displaceable (cf. FIGS. 2 and 4*a*) and/or in the manner of a lever (cf. FIGS. 3 and 4*b*).

The second coupling element 17 for decoupling can have a deflection contour 17*a* which for decoupling the second output 8 from the first output 6 slides on the first coupling element 12, on account thereof decoupling the second coupling element 17 from the activation movement.

The second coupling element 17 can also have a guide 18. The second coupling element 17 herein can be guided by the guide 18 and by the first coupling element 12. As is shown in FIG. 2, the guide 18 can have a decoupling portion 18a which enables decoupling of the second coupling element 17 from the first coupling element 12.

Figure 2:
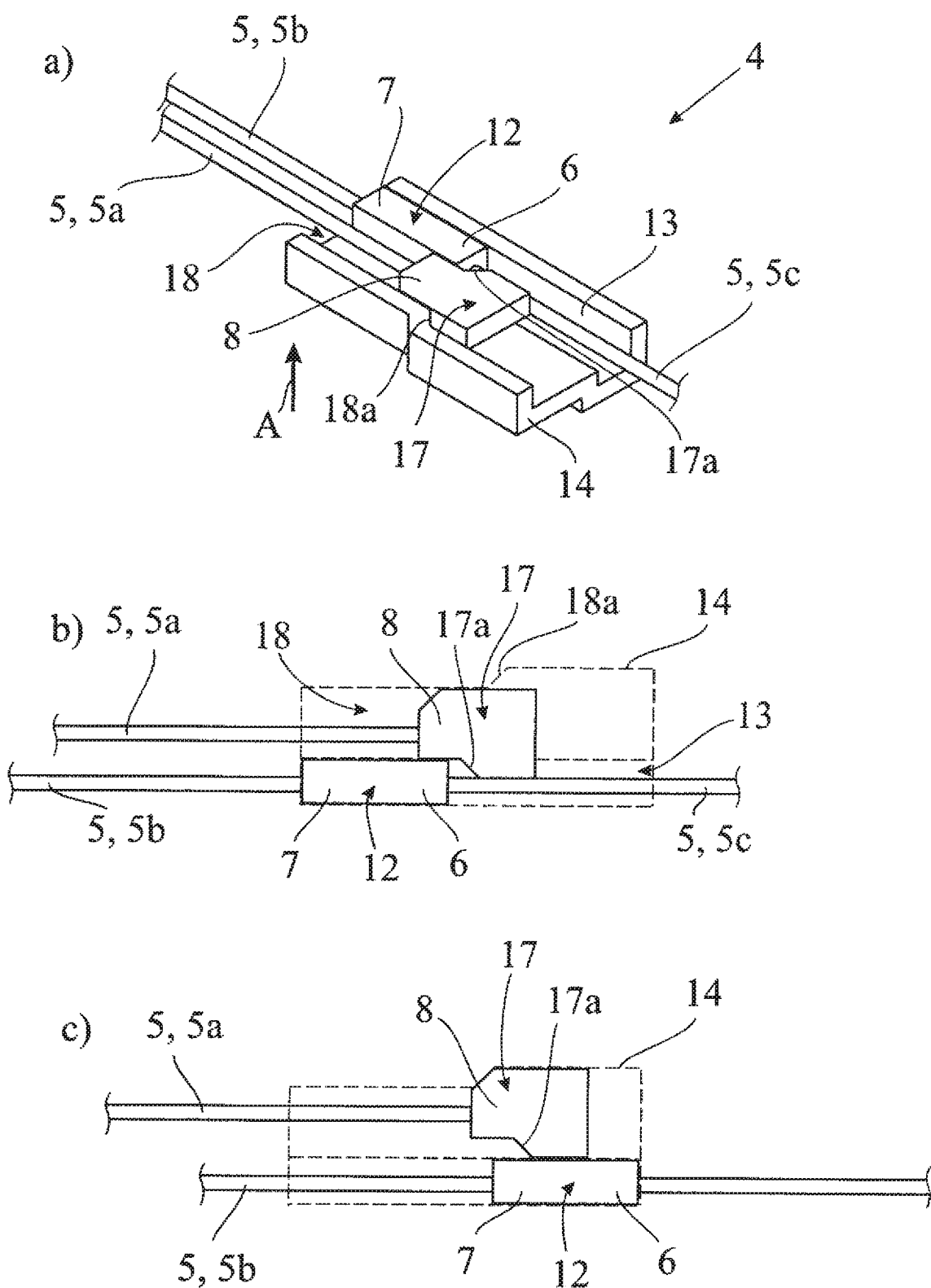
FIG. 2 in a) shows a schematic three-dimensional illustration of an activation installation according to the proposal, in b) shows a two-dimensional view according to A from FIG. 2a) prior to the commencement of the activation movement, and in c) shows a two-dimensional view according to A from FIG. 2a) at the end of the activation movement.

The activation movement in the exemplary embodiment of FIG. 2 acts on the first input 6. The first coupling element 12 correspondingly covers the distance of an activation path. On the first activation portion of the activation movement the first coupling element 12 transmits a portion of the activation movement to the second coupling element 17. When the decoupling portion 18a is reached, the second coupling element 17 by sliding on the deflection contour 17a decouples from the first coupling element 12. The second coupling element 17 herein can be also moved at least transversely to the activation movement. As a result, an activation path that is longer for the first coupling element 12 than for the second coupling element 17 can be created. The movement of the second coupling element 17 herein can be performed in a purely translatory manner.

Herein it can apply furthermore that the second coupling element 17 following decoupling remains decoupled from the first coupling element 12 for at least until the first coupling element 12 again completes a movement counter to the activation movement, such as until said first coupling element 12 has been returned to the decoupling position.

Figure 3:
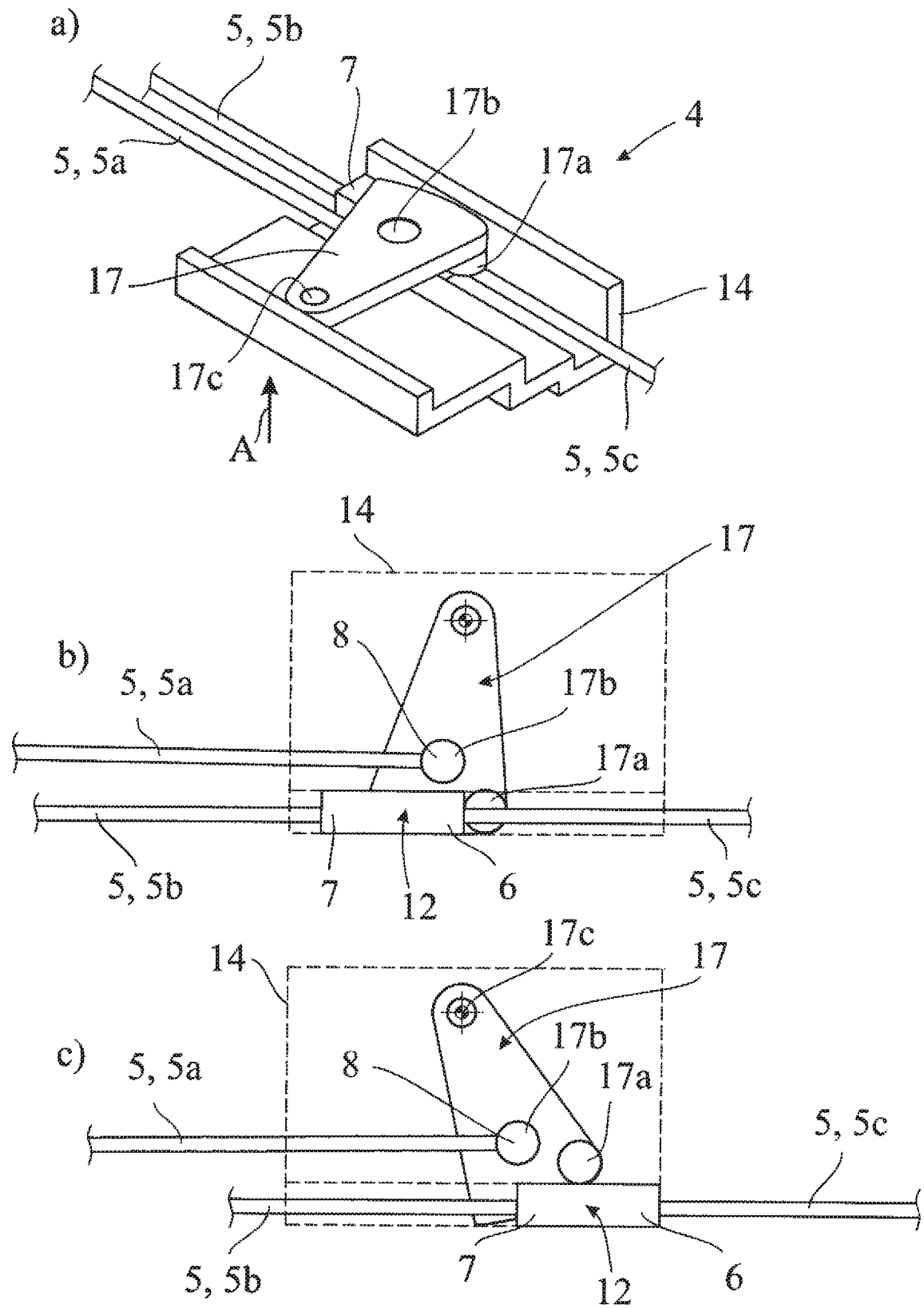
FIG. 3 in a) shows a schematic three-dimensional illustration of a second exemplary embodiment of an activation installation according to the proposal, in b) shows a two-dimensional view according to A from FIG. 3a) prior to the commencement of the activation movement, and in c) shows a two-dimensional view according to A from FIG. 3a) at the end of the activation movement.

The second coupling element 17 in the exemplary embodiment of FIG. 3 is not configured so as to be displaceable, but rather in the manner of a lever. The lever-type second coupling element 17 has a coupling point 17b which forms the second output 8. Said second coupling element 17 herein can be rotatably mounted on the housing 14 by way of a centre of rotation 17c. The coupling point 17b can be disposed so as to be closer to the rotation axis of the coupling element 17 than the deflection contour 17a. A variation in the gearing of the activation movement is enabled on account thereof. Said variation in the gearing can be utilized for adapting the force or adapting the path, respectively, of the activation movement when the latter is distributed to the second functional element 10.

The deflection contour 17a herein can be formed by a cylindrical portion. If an activation movement acts now on the first input 6, the first coupling element 12 likewise covers the distance of a corresponding activation path. On the first activation portion of the activation movement the first coupling element 12 by way of the deflection contour 17a transmits a portion of the activation movement to the second coupling element 17. Said deflection contour 17a herein can be configured as a pin. The second coupling element 17 that is configured in the manner of a lever is deflected. The deflection contour 17a in this case slides on the first coupling element 12, decoupling the second coupling element 17 on a second portion of the activation movement. Here too, the second coupling element 17 can remain decoupled from the first coupling element 12 at least until the first coupling element 12 completes a movement counter to the activation movement.

Figure 4:
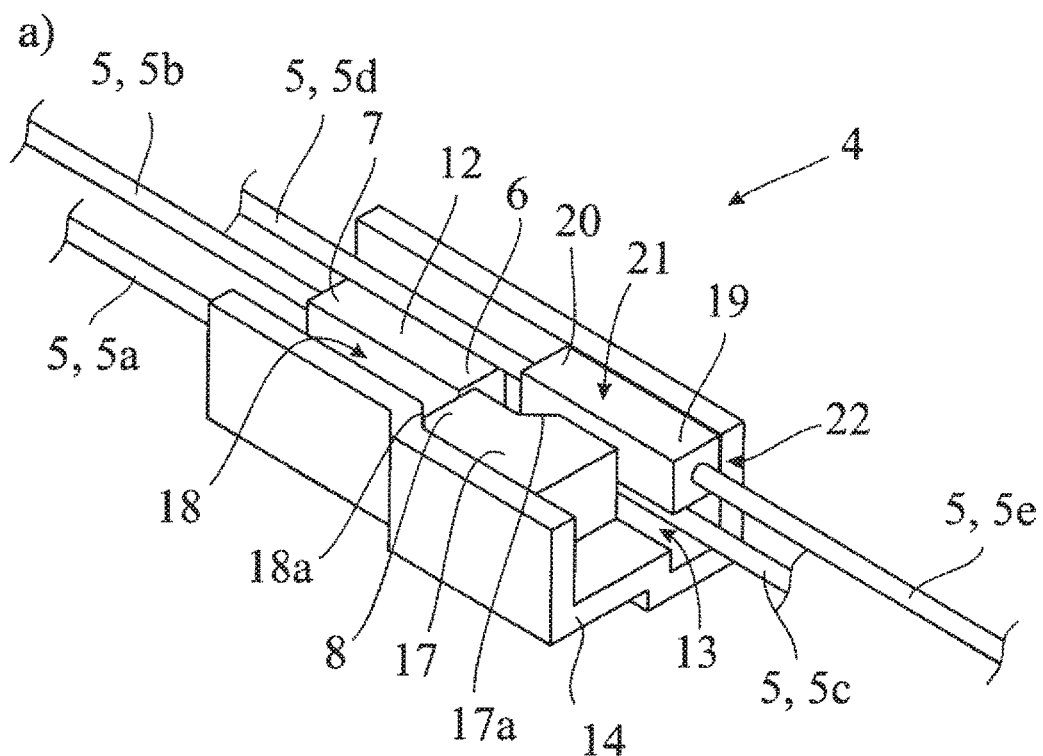
FIG. 4 in a) shows a third exemplary embodiment of an activation installation according to the proposal in a schematic three-dimensional illustration, and in b) shows a fourth exemplary embodiment of an activation installation according to the proposal in a schematic three-dimensional illustration.
Figure 4:
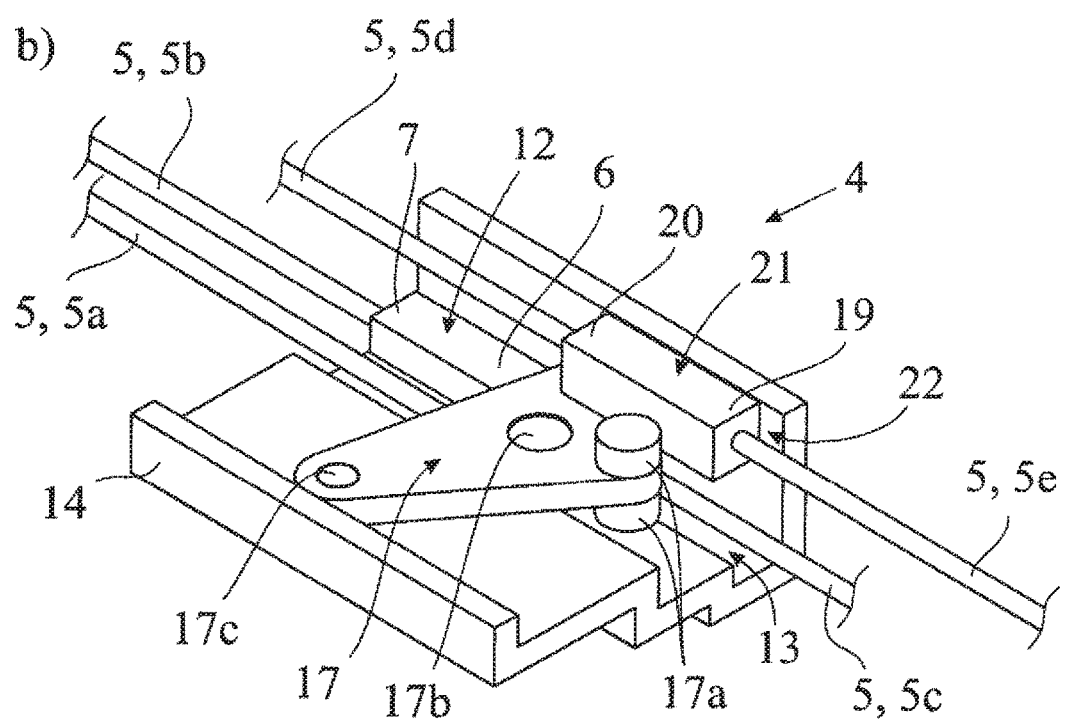

The activation arrangement 3 can furthermore also have a second input 19 and/or a third output 20. Two exemplary embodiments relating thereto are shown in FIG. 4. Said two exemplary embodiments moreover are configured in a manner substantially identical to that of the activation arrangements of the exemplary embodiments of FIGS. 2 and 3.

In this instance, in the assembled state of the activation installation 3, on a first portion of an activation movement that acts on the second input 19 of the distribution installation 4, the second input 19 for transmitting the activation movement in portions to the second functional unit 10 can be coupled or is to be coupled to the second output 8. In this instance, at the commencement of a second portion of the activation movement, the second input 19 and the second output 8 for interrupting the transmission of the activation movement to the second functional unit 10 are decoupled.

According to the third and the fourth exemplary embodiment (FIG. 4) it can be that the distribution installation 4 has a third output 20, and that in the assembled state of the activation installation 3, on a first portion of an activation movement that acts on the second input 19 of the distribution installation 4, the second input 19 for transmitting the activation movement in portions to the first functional unit 9 and/or to a third functional unit (not shown) is coupled or is to be coupled to the third output 20. Additionally or alternatively, in the assembled state of the activation installation 3, on a second portion of an activation movement that acts on the second input 19 of the distribution installation 4, the second input 19 for transmitting the activation movement in portions to the first functional unit 9 and/or to a third functional unit (not shown) can be coupled or is to be coupled to the third output 20.

In order for the activation movement to be transmitted at least in portions from the third output 20 to the first functional unit 9 or to the third functional unit, the activation installation 3 herein can have a further flexible transmission means 5d. The further flexible transmission means 5d herein can couple the third output 20 to the internal activation lever 9c or to the external activation lever 9b of the motor vehicle lock 9a.

The activation installation 3 herein can have a further door handle 11, in particular an internal door handle 11b and/or an external door handle 11a, which acts on the second input 19 of the distribution installation 4. The further door handle 11 herein acts on the second input 19 by way of a flexible activation element 5e.

In the exemplary embodiments of FIG. 4, the second input 19 and/or the third output 20 are/is formed by a third coupling element 21. Here too, the third coupling element 21 is configured so as to be integral.

In terms of the design embodiment of the third coupling element 21 and of the transmission means 5d, 5e that engage on the third coupling element 21 reference is made to the explanations pertaining to the first coupling element 12. The first coupling element 12 and the third coupling element 21 can be of identical design. However, the lengths of the transmission means 5 that engage on the coupling elements 12, 21 can differ.

The third coupling element 21 can be guided by a guide 22. The latter herein can be configured by the housing 14. In an activation movement that acts on the second input 19, the second coupling element 17 herein can be guided by the guide 18 and by the third coupling element 21.

In order for the second output 8 to be decoupled from the first input 6 and/or the second input 19 during the commencement of a second portion in the activation movement, the second coupling element 17 herein by the first coupling element 12 and/or the third coupling element 21 can be moved out of the movement path of the first coupling element 12 or of the third coupling element 21, respectively. This can be performed in a manner such as has already been described above for the exemplary embodiments of FIGS. 2 and 3 in the context of the first and the second coupling element 12, 17.

The activation movements of the first and of the third coupling element 12, 21 can run in parallel. The activation movement that is transmitted in portions to the second coupling element 17 can likewise run so as to be parallel with the activation movement of the first and/or the third coupling element 12, 21. However, the activation movement of the second coupling element 17 do not run in a common plane shared with the activation movements of the first and of the third activation element 12, 21.

It is finally to be pointed out that the flexible transmission means 5, 5a, 5b, 5c, 5d, 5e herein can be Bowden controls. However, these can also be cables.

The invention claimed is:

1. An activation installation for a motor vehicle door, comprising:
    a distribution installation and a flexible transmission element;
    wherein the distribution installation comprises a first input, a first output, and a second output, and wherein the distribution installation is configured to distribute an activation movement to two functional units;
    wherein during a normal operation, the flexible transmission element is configured to transmit the activation movement at least in portions from the distribution installation to a first functional unit of the two functional units, or to transmit the activation movement at least in portions from the distribution installation to a second functional unit of the two functional units;
    wherein during the normal operation, in an assembled state of the activation installation, on a first portion of the activation movement that acts on the first input of the distribution installation, the first input is coupled or is configured to be coupled to the second output for transmitting the activation movement in portions to the second functional unit during the first portion of the activation movement; and
    wherein during the normal operation, at the commencement of a second portion of the activation movement, the first input and the second output are decoupled for interrupting the transmission of the activation movement to the second functional unit during the second portion of the activation movement;
    wherein during the normal operation, in the assembled state of the activation installation, on the second portion of the activation movement that acts on the first input of the distribution installation, the first input is coupled or is configured to be coupled to the first output for transmitting the activation movement in portions to the first functional unit during the second portion of the activation movement;
    wherein during the normal operation, in the assembled state of the activation installation, on the first portion of the activation movement that acts on the first input of the distribution installation, the first input is coupled or is configured to be coupled to the first output for transmitting the activation movement in portions to the first functional unit during the first portion of the activation movement; and
    wherein the activation installation is configured to initiate the first portion of the activation movement and the second portion of the activation movement each time the flexible transmission element transmits the activation movement.

2. The activation installation according to claim 1, wherein the activation installation comprises the first functional unit, wherein the first functional unit is a motor vehicle lock.

3. The activation installation according to claim 1, wherein the activation installation comprises the second functional unit, wherein the second functional unit is a secondary lock and/or a door arrester.

4. The activation installation according to claim 1, wherein the activation installation comprises a further flexible transmission element configured to transmit the activation movement at least in portions from the first output to the first functional unit.

5. The activation installation according to claim 1, wherein the activation installation comprises a door handle which acts on the first input of the distribution installation by way of a further flexible transmission element.

6. The activation installation according to claim 1, wherein the distribution installation comprises a second input, and wherein in the assembled state of the activation installation, on a first portion of an activation movement that acts on the second input of the distribution installation, the second input is coupled or is to be coupled to the second output for transmitting the activation movement in portions to the second functional unit.

7. The activation installation according to claim 1, wherein the distribution installation comprises a third output, and wherein in the assembled state of the activation installation, on a first portion of an activation movement that acts on a second input of the distribution installation, the second input is coupled or is to be coupled to the third output for transmitting the activation movement in portions to the first functional unit and/or to a third functional unit, and/or wherein in the assembled state of the activation installation, on a second portion of an activation movement that acts on the second input of the distribution installation, the second input is coupled or is to be coupled to the third output for transmitting the activation movement in portions to the first functional unit and/or to the third functional unit.

8. The activation installation according to claim 7, wherein the activation installation comprises the flexible transmission element configured to transmit the activation movement at least in portions from the third output to the first functional unit or to the third functional unit.

9. The activation installation according to claim 7, wherein the second input and/or the third output are/is formed by a third coupling element, wherein the third coupling element is configured so as to be integral, wherein the transmission elements at the second input and the third coupling element are configured so as to be integral, and/or wherein the transmission elements at the third output and the third coupling element are configured so as to be integral.

10. The activation installation according to claim 9, wherein a second coupling element for decoupling from a first and/or the third coupling element is moved out of the movement path of the first coupling element and/or of the third coupling element.

11. The activation installation according to claim 9, wherein the distribution installation comprises a guide for guiding movements of the first coupling element, and/or wherein the distribution installation comprises a guide for guiding movements of the second coupling element, and/or wherein the distribution installation comprises a guide for guiding movements of the third coupling element.

12. The activation installation according to claim 1, wherein the activation installation has a further door handle, which acts on a second input of the distribution installation.

13. The activation installation according to claim 1, wherein the first input and/or the first output are/is formed by a first coupling element, wherein the first coupling element is configured so as to be integral, wherein the flexible transmission element at the first input and the first coupling element are configured so as to be integral, and/or wherein the flexible transmission element at the first output and the first coupling element are configured so as to be integral.

14. The activation installation according to claim 1, wherein the second output is formed by a second coupling element, wherein the second coupling element is configured so as to be integral.

15. The activation installation according to claim 1, wherein the distribution installation and/or the first functional unit and/or the second functional unit comprise a housing.

16. The activation installation according to claim 15, wherein the housing provides a guide or guides, respectively, for a first and/or a second and/or a third coupling element.

17. A motor vehicle door comprising the activation installation according to claim 1.

18. A method for activating an activation installation comprising a distribution installation comprising a first input and a first output as well as a second output, the method comprising:

acting on the first input of the distribution installation with an activation movement to distribute the activation movement to two functional units;

coupling the first input to the second output on a first portion of the activation movement to transmit the activation movement in portions to a second functional unit of the two functional units during the first portion of the activation movement;

decoupling the first input and the second output at the commencement of a second portion of the activation movement for interrupting the transmission of the activation movement to the second functional unit during a normal operation;

coupling the first input to the first output to transmit the activation movement in portions to a first functional unit of the two functional units during the first and the second portion of the activation movement; and wherein the activation installation is configured to initiate the first portion of the activation movement and the second portion of the activation movement each time the flexible transmission element transmits the activation movement.

19. The method according to claim 18, wherein the activation installation is configured according to claim 1.

* * * * *